United States Patent
Ghasemi et al.

(10) Patent No.: US 9,613,256 B2
(45) Date of Patent: Apr. 4, 2017

(54) METHOD AND APPARATUS FOR IDENTIFYING LOCAL FEATURES

(71) Applicant: Vidinoti SA, Fribourg (CH)

(72) Inventors: Alireza Ghasemi, Lausanne (CH); Laurent Rime, Fribourg (CH); Martin Vetterli, Grandvaux (CH)

(73) Assignee: Ecole Polytechnique Federale de Lausanne (EPFL) (CH)

(*) Notice: Subject to any disclaimer, the term of this patent is extended or adjusted under 35 U.S.C. 154(b) by 629 days.

(21) Appl. No.: 14/069,504

(22) Filed: Nov. 1, 2013

(65) Prior Publication Data

US 2014/0369594 A1 Dec. 18, 2014

(30) Foreign Application Priority Data

Jun. 12, 2013 (CH) .................................. 1102/13

(51) Int. Cl.
*G06K 9/00* (2006.01)
*G06T 7/00* (2017.01)

(52) U.S. Cl.
CPC ........ *G06K 9/00201* (2013.01); *G06T 7/0036* (2013.01); *G06T 7/0085* (2013.01); *G06T 7/0095* (2013.01); *G06T 2200/21* (2013.01); *G06T 2207/10052* (2013.01); *G06T 2207/20061* (2013.01); *G06T 2207/20164* (2013.01); *G06T 2207/20212* (2013.01); *G06T 2207/20228* (2013.01)

(58) Field of Classification Search
None
See application file for complete search history.

(56) References Cited

U.S. PATENT DOCUMENTS

| | | | | |
|---|---|---|---|---|
| 2007/0291125 A1* | 12/2007 | Marquet | ............ | H04N 13/0203 348/207.99 |
| 2009/0304264 A1* | 12/2009 | Au | ........................ | G06T 7/0065 382/154 |
| 2014/0211989 A1* | 7/2014 | Ding | .................... | G06K 9/6211 382/103 |
| 2014/0328535 A1* | 11/2014 | Sorkine-Hornung | ..... | G06T 5/00 382/154 |

FOREIGN PATENT DOCUMENTS

| | | |
|---|---|---|
| EP | 1246080 A2 | 10/2002 |
| EP | 2207113 A1 | 7/2010 |

OTHER PUBLICATIONS

Hasegawa "Proposal of Amplitude only Logarithmic Radon Transform for Pattern Matching Relation with Fourier-Mellin Transform", 2008 IEEE, pp. 1-4.*
S. Gauglitz et al., "Evaluation of Interest Point Detectors and Features Descriptors for Visual Tracking," Int'l Journal of Computer Vision, Mar. 31, 2011, pp. 1-26.
J. Berent et al., "Plenoptic Manifolds," IEEE Signal Processing Magazine, Nov. 2007, vol. 24, No. 6, pp. 34-44.

* cited by examiner

*Primary Examiner* — Weiwen Yang
(74) *Attorney, Agent, or Firm* — Blank Rome LLP (57) ABSTRACT

A method of local feature identification comprises retrieving data representing a lightfield, forming an epipolar volume (V) from the retrieved data, applying a transform to epipolar planes retrieved from the epipolar volume, so as to represent the epipolar planes in a new space, identifying a plurality of epipolar lines, and identifying local features (fp) based on at least some of the epipolar lines.

30 Claims, 4 Drawing Sheets

METHOD AND APPARATUS FOR IDENTIFYING LOCAL FEATURES

FIELD OF THE INVENTION

The present invention concerns a local feature identification method and apparatus for identifying interest points in light field images.

DESCRIPTION OF RELATED ART

Identification of local features in images is a core component of many computer vision tasks. Feature detectors determine local distinct patterns in an image which are repeatable under different transformations of the scene of interest. After detection, these points are further processed, recognized or tracked in consecutives images or frames taken from a scene. Feature detectors are used among others in augmented reality systems for comparing captured images with reference images, and annotating the captured images in case of match of the local features retrieved from both images.

One popular application of local feature detection is for augmented reality applications. In such an application, a user points a portable device towards a scene, e.g. a landscape, a building, a poster, or a painting in a museum, and the display shows the image together with superimposed information concerning the scene. Such information can include names, e.g. for mountains and habitations, people names, historical information for buildings, and commercial information such as advertising, e.g. a restaurant menu. An example of such a system is described in EP1246080 and in EP2207113. Augmented reality application commonly involve a step of matching local features in a captured image with local features of previously captured reference images, and superimposing annotations associated with the reference images over corresponding elements of the captured image.

S. Gauglitz et al. describe in "Evaluation of interest point detectors and feature descriptors for visual tracking", International journal of computer vision, pp. 1-26, 2011, various interest point detectors and feature descriptors used in visual feature-based tracking applications. In feature-based visual tracking, a set of interest points are matched in consecutive frames of a video signal.

A desirable feature detector should be invariant to certain transform and changes, i.e., it should detect the same set of features when the captured image undergoes certain affine transforms such as scaling, rotation, changes of illumination, etc. However, achieving true invariance in feature detection requires scene's information which is mostly lost during the image formation process in the camera. For example, depth and occlusion information is lost in images taken with a conventional pinhole camera. These kinds of information are very decisive in detecting corners and salient points of the scene being captured. Advantageously, this information could also be used for describing robust feature vectors. Without access to depth or occlusion, conventional feature detectors usually have to rely mostly on color and texture information to distinguish feature points.

On the other hand, plenoptic capturing devices, which are known as such, capture a data representing the lightfield, i.e. a matrix indicating not only the aggregated intensity of light, but also more complete information about the light field including the direction of light. For example, plenoptic cameras systems are known as lens-array based cameras or camera-array based systems. Since the representation of the lightfield is more complete, one can expect that a more robust feature vector identification could be performed with plenoptic images delivered by plenoptic cameras.

More generally, a given lightfield could be described by a so-called plenoptic function P in its most general form:

$$P = P_7(x, y, V_x, V_y, V_z, t, \lambda)$$

where $(x, y)$ are spatial coordinates of a pixel, $(V_x, V_y, V_z)$ are the spatial coordinates of the camera position, t is the time, and $\lambda$ is the wavelength. This plenoptic function contains a significant amount of information about the captured scene, camera setup and other acquisition parameters.

However, a seven-dimensional signal is difficult to acquire and process. Therefore, in practice, many devices capture a subset of dimensions. For example, a video camera typically capture parameters x, y, t and $\lambda$. A linear camera array or a still camera that moves at constant speed along the direction x may capture the parameters x, y and $V_x$. This latest restriction of the plenoptic function is known as an epipolar plane image (EPI) volume.

Figure 1:
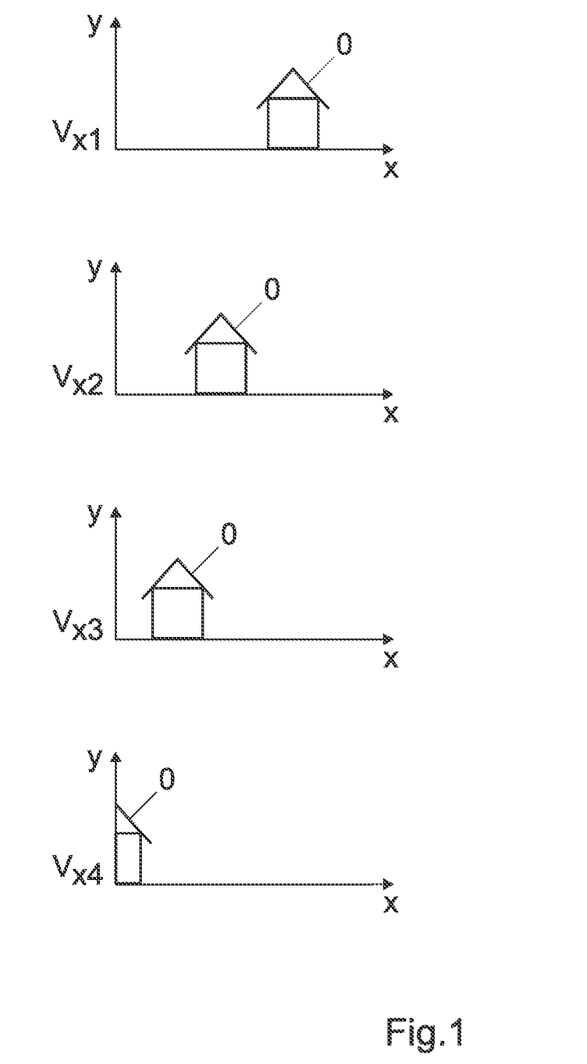
FIG. 1 shows four images of a scene from four different viewpoints.
Figure 2:
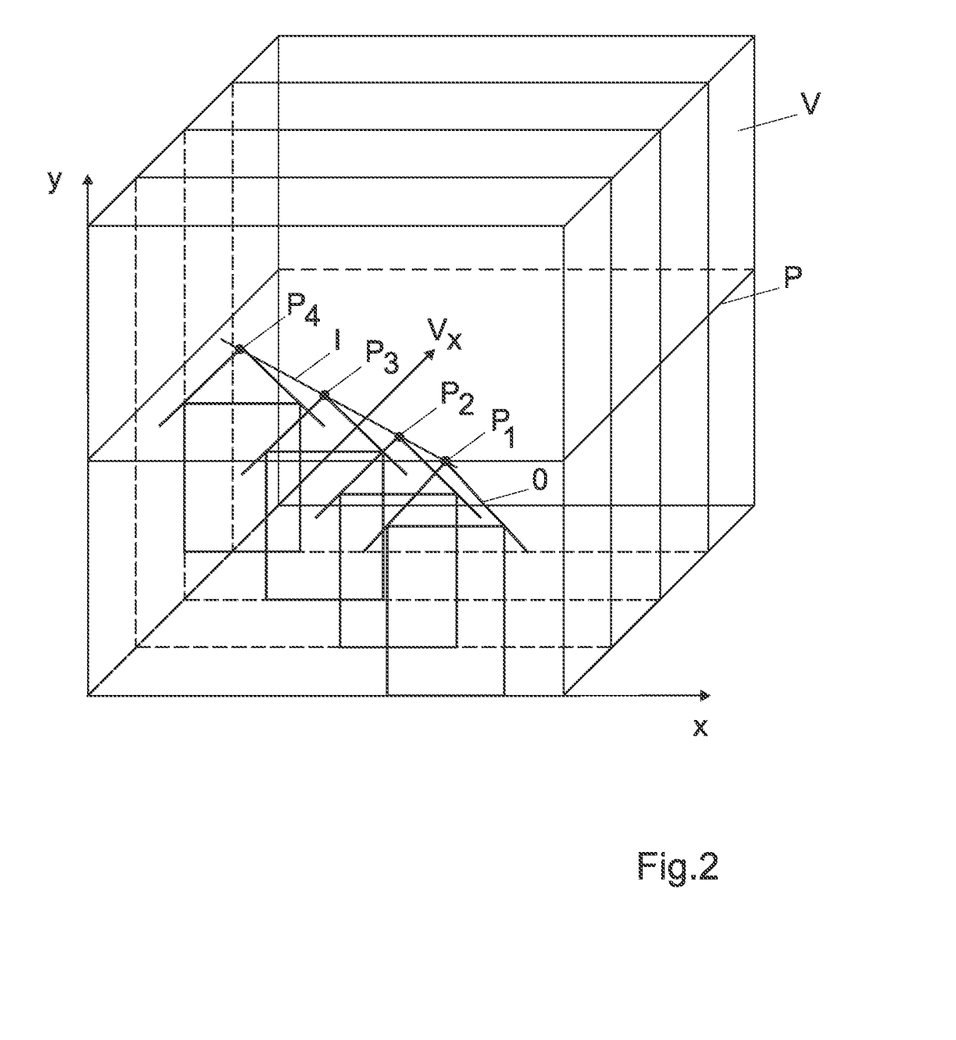
FIG. 2 shows an epipolar volume corresponding to those four images and defining a lightfield.

FIG. 1 illustrates four successive views of a scene captured with a still camera from successive positions $V_{x1}$, $V_{x2}$, $V_{x3}$, $V_{x4}$. FIG. 2 shows the EPI volume corresponding to successive views juxtaposed. We can recognize volumes carved out by elements in the images, which are known as EPI tubes. EPI tubes are strongly regular and redundant because of the constraints of the camera motion and that they are constructed from successive images of the same scene.

Each scene point corresponds to a line in one of the $x$-$V_x$ slices of the epipolar volume (an horizontal slice in FIG. 2). Moreover, it can be seen that closer objects will move faster from one frame to the next that objects at a greater depth. It can be shown that the slope of this line is proportional to the depth (Z value) of the point in the scene.

Each point of a scene is therefore mapped to a trajectory in the plenoptic space x, y, $V_x$, and objects made up of neighbouring points are mapped to hypervolumes made up of neighboring trajectories. This collection of trajectories forms a manifold M which is sometimes referred as a plenoptic manifold. J. Berrent el. Suggest in "Plenoptic manifolds", Signal processing Magazine, IEEE, vol. 24, n° 6, pp. 34-44, 2007, an approach for extraction of plenoptic manifolds, which could be used for segmenting a plenoptic image. Several views x,y from different positions $V_x$ contain more information about the scene than a single view x,y and the proposed identification of local feature is more robust and less dependent on translation than conventional local feature identification methods based on a single view x,y. However, the running time of the algorithm is very long.

It is therefore an aim of the present invention to provide a new method for local feature identification.

In particular, an aim of the present invention is to provide a new method for invariant representation of plenoptic images.

In particular, an aim of the present invention is to provide a faster method for representation of plenoptic images.

An aim of the present invention is also to provide a more robust method for local feature identification, i.e., a method which is less dependent on transforms such as scaling and/or rotation, and/or changes of illumination, etc It is an aim of the present invention to provide a new method for feature identification of plenoptic images.

It is an aim of the present invention to provide a new method for local feature identification from epipolar volumes representing plenoptic images.

BRIEF SUMMARY OF THE INVENTION

According to the invention, these aims are achieved by means of a method of local feature identification, comprising the steps of:
  retrieving data representing a lightfield;
  forming an epipolar volume (V) from the retrieved data;
  applying a transform to epipolar planes retrieved from said epipolar volume, so as to represent said epipolar planes in a new space;
  identifying a plurality of epipolar lines;
  identifying local features based on at least some of said epipolar lines.

Identification of epipolar lines may be faster and more robust in the new space. The transform is preferably chosen so as to allow for a faster and more robust identification of epipolar lines.

The transform may be a Radon transform.
The transform may be a Hough transform.
The transform may be based on the relation $$\lambda y + \lambda \ln \lambda x = \mu$$

where x and y are coordinates in the epipolar plane.

The method may comprise a step of identifying a line and dividing all the corresponding $\lambda i$ by the largest one.

The method may further comprise a step of computing a scale-invariant value (g(s)) as an integral over $\lambda$.

The transform may be a Mellin transform.

The method may comprise a step of applying a low-pass filter to data representing said epipolar plane.

The method may comprise a step of applying an edge detection algorithm to data representing said epipolar plane.

The method may comprise a step of identifying prospective feature points with a corner/feature method applied to an initial image corresponding to said lightfield, and only considering said lines in said new space that correspond to said prospective feature points as possible feature points.

The method may comprise a step of determining from said new space lines (l) in said epipolar plane The method may comprise a step of selecting points in said new space with an intensity higher than a predefined threshold, and determining lines in said epipolar plane that correspond to said selected point.

The method may comprise a step of pruning the set of detected lines and only retaining the most stable ones, for example the lines longer than a threshold $\tau 2$.

The method may comprise a post-processing step applied after said transform step in order to ignore lines for which variance of intensity or color along the points is above some threshold.

The method may comprise a step of retrieving one point along at least one selected epipolar line and this point to identify a local feature.

The local feature may be described with a feature vector (fp).

The local feature may be described with a three dimensional SIFT or BRIEF feature vector (fp).

The local feature may be described with a two dimensional feature vector (fp) by considering only the image plane in which the feature point falls.

The method may further comprise the step of computing a significance ratio for at least some prospective feature points, and omitting those feature points whose significance ration is lower than a threshold.

The significance ratio for a prospective feature point may depend on the number and/or orientation or epipolar lines passing through a neighborhood of said prospective feature point.

The method may comprise a step of matching said local features (fp) with local features extracted from a 2D, 2D and half or 3D image.

The method may further comprise steps of, detecting the dominant orientation of an image which corresponds to said light field, and rotating each of a plurality of images, each of which corresponds to a light field, so that each of the plurality of image has its orientation aligned to a reference orientation computed based on the detected dominant orientation.

The method may further comprise steps of, applying a tilting transform to an image which corresponds to said light field, wherein the step of applying a tilting transform to an image comprises scaling and translating the image in one dimension.

The tilting transform may comprise a Fourier and/or a Mellin transforms.

A method may further comprise the step of applying a STILT transform to the data representing said epipolar plane after the edge detection algorithm has been applied.

According to a further aspect of the present invention there is provided an apparatus for identifying local features in lightfield representing data, comprising a lightfield data retrieving device (2) for retrieving data representing a lightfield; and data processing means programmed for:
  forming an epipolar volume (V) from the retrieved data;
  applying a transform to epipolar planes retrieved from said epipolar volume, so as to represent said epipolar planes in a new space;
  identifying a plurality of epipolar lines (l);
  identifying local features (fp) based on at least some of said epipolar lines.

According to a further aspect of the present invention there is provided a tangible data carrier comprising program code arranged for causing a processor to carry one or more of the above-mentioned method steps.

We want now to define some of the terms used in the present description and/or in the claims:

Plenoptic Function: A function that describes the radiance fairing in every direction through every point in space. In one possible embodiment, a plenoptic function is a generalization of an image where as well as horizontal and vertical coordinates of the image we can vary the location of the camera in space (at least along one axis, or in two or 3 dimensions in the most general form) and optionally time and optionally wavelength.

Epipolar Image Volume: A particular case of the general plenoptic function having 3 dimensions. One way of capturing it is to have the scene static and camera only moving horizontally perpendicular to the image normal.

Epipolar Plane: A horizontal slice of the epipolar volume, such as for example a function of the form $f(x; y_0; V_x)$ where $y_0$ is constant.

Epipolar Line: A line segment in an epipolar plane that corresponds to a unique scene point. Depending on the acquisition method used for the epipolar volume the line might be a straight line (in the case of translation), a hyperbola (in the case of zooming), a sinusoid (in the case of circular movements), etc Local feature: a local portion of an image or of a lightfield. Local features could be represented by a feature vector, such as a binary vector. Local features could be used to find matching images, by verifying if one reference image has a similar set of local features (measured by proximity of feature vectors) than a test image.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

A successful feature detection approach should be invariant to certain types of transformations (e.g. rotation, scaling or illumination change). In applications such as street-level localization or street-level augmented reality, one important transformation which may happen between training and test images is scaling. This is because the user will most probably be closer or further from/to the subject compared to the training photo. Therefore, a scale-invariant representation for the plenoptic function is highly desirable. As will be described later, this representation is obtained with a transform and some pre- and/or post-processing steps.

The effect of scaling on the plenoptic function can be analyzed if we consider the epipolar lines and their properties. Slopes of the epipolar lines are proportional to the depths of their corresponding scene points. Moreover, scaling can be interpreted as adding a constant value to the depth of all points (i.e. adding a constant value to slopes of all points). This is very similar to (but not exactly) rotating the epipolar plane.

The local feature identification and description method of the present invention thus preferably includes a first step 101 (FIG. 3) of retrieving data d representing a lightfield 1, expressed by a plenoptic function. This step could include capturing the lightfield with lightfield retrieving apparatus 2 such as a plenoptic camera, capturing a plurality of views of a scene from various viewpoints with a plurality of still cameras, with a video camera, or with a still cameras moving from one viewpoint to the next, retrieving the lightfield from a memory or from a telecommunication network, and/or generating the lightfield with a suitable plenoptic editor.

In one embodiment, a lightfield is captured by asking a user with a conventional digital camera to translate its camera, for example by a few centimeters, between successive views. A stabilization processing step could be performed to compensate for the shaking in unwanted directions between successive views.

In one embodiment, the lightfield is captured with a conventional digital camera by moving in the z direction, by scaling or by zooming between successive views. A sequence of images with varying zoom is thus captured and formed as a volume.

The plenoptic function that represents the lightfield includes the two dimensions x,y and at least one additional dimension, for example the time and/or the position of the camera along at least one direction, for example $V_x$. The wavelength $\lambda$ may also be used in case of color image, and/or the time t in case of video images or dynamic scenes.

In a second step, the method preferably includes a step 102 of forming at least one epipolar volume V (FIG. 2) from the retrieved lightfield. This may include omitting some parameters of the plenoptic function, for example omitting the $V_y$ and $V_z$ parameters and assuming a camera motion along a single axis, for example $V_x$. An example of epipolar volume is illustrated on FIG. 2, corresponding to the plurality of images x,y of FIG. 1 captured from a camera at various positions $V_x$ along the x axis. A plurality of epipolar volumes may be formed if the plenoptic function has more parameters, for example one epipolar volume for each discrete wavelength $\lambda_k$ or for each discrete time (or frame) $t_k$ or each direction ($V_x$, $V_y$ and $V_z$).

Figure 4:
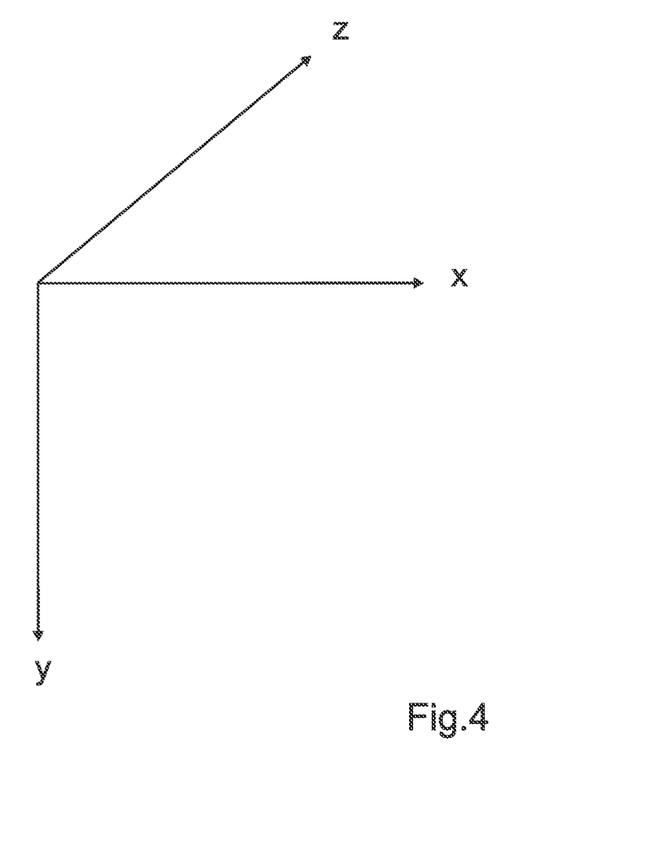
FIG. 4 illustrates the axes x, y, z.

In each horizontal plane p of this epipolar volume V, lines l are dominant objects; successive points $P_1$, $P_2$, $P_3$, $P_4$, ... $P_i$ along each line l correspond to successive positions of an object o in successive views from viewpoints at various distances $V_x$. Closer objects will move faster between successive images than more remote objects, and thus the slope of each line is proportional to the depth of the corresponding scene point, along the z axis: the higher the slope, the further the target object. Moreover, scaling can be interpreted as adding a constant value to the depth of all points. This is very similar to (but not exactly) rotating the epipolar plane. The directions of the axis x, y and z is illustrated on FIG. 4; the directions for $V_x$, $V_y$ and $V_z$ correspond to the same directions as for x, y and z respectively.

In the case where the epipolar volume is formed by successive images captured at varying zoom, scene points traverse hyperbolas in the x-$V_z$ slices. Each hyperbola line has two parameters which correspond to the slope and intercept of epipolar lines in the case of horizontal movement along $V_x$.

Figure 3:
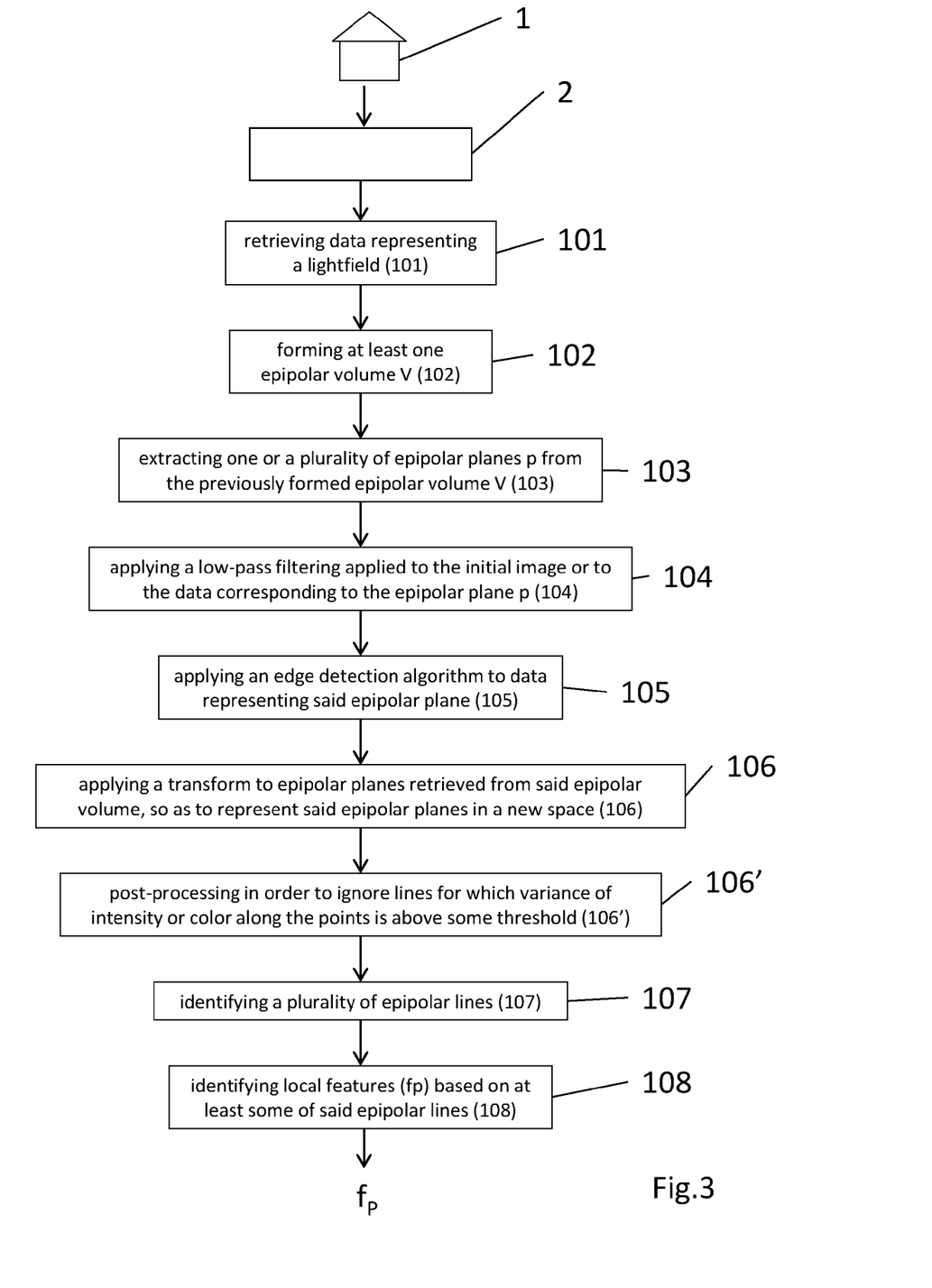
FIG. 3 is a flowchart that shows successive steps used in the method of the invention.

The local feature description method of the invention preferably includes a step 103 of extracting one or a plurality of epipolar planes p from the previously formed epipolar volume V.

An optional edge detection step 105 might be applied to the data corresponding to epipolar plane or to the initial image as a preprocessing step. There might be several reasons for this. First reason is that many transforms, such as the Hough Transforms, work on binary images. Therefore a thresholding operation may be applied to apply to the image or the epiloar plane in order to convert it into a binary image. A second reason is that edge detection helps in removing irrelevant points since line usually lie in the edges of the image. Yet another reason might be the improvement in the speed by reducing the number of points the algorithm is applied on.

As well as edge detection and before that, an optional low-pass filtering step 104 may also be applied to the initial image or to the data corresponding to the epipolar plane p. The reason for this is to reduce noise before edge detection is applied so that it doesn't detect noisy points as edges. Low-pass filtering also reduces the number of feature points to be detected by omitting the ones that don't distinguish clearly over their neighbours, and thus reduce the running time of the algorithm.

Since lines are dominant objects in the epipolar planes, the local feature identification method of the invention preferably includes a step of detecting those lines. This is advantageously done by first at step 106 representing the epipolar planes in a new space in which detection of lines is easier, and subsequently during step 107 detecting the lines in the new space.

Preferably illumination invariance is applied to both captured lightfield as a whole and each of its constituent images (i.e. at both a light field level and view level) before the step 107 of detecting the lines in the new space, as this will improve the results of the line detection algorithms. Illumination invariance in the captured light field is obtained by applying edge detection before running a STILT transform. A STILT transform is an exponential Radon Transform. By applying edge detection the image is converted to a binary image and therefore lightning changes mostly vanish. Illumination invariance in the corresponding image can be achieved number of different ways. One simple way is to convert the RGB channel to a more robust color space which isolates the effect of illumination changes. For example, the HSV space mostly isolates the illumination changes in the V (value) channel. We can easily normalize the V channel to cancel the effect of normalization. The YCbCr space is often used for this purpose. The YCbCr space is another color space which isolates the illumination factor mostly in the Y channel and therefore, by normalizing this channel to be constant along the image, we can cancel the effect of illumination changes.

A possible approach to represent the epipolar plane p in a new space is to use the Radon transform. Radon transform R of a function f(x; y) is defined as:

$$R(\rho,\theta) = \iint f(x,y)\sigma(x \cos \theta + y \sin \theta - \rho) dx dy$$

In Radon transform, the plane of the image of interest, e.g. $x$-$V_x$, is transformed to a $\theta$-$\rho$ plane in which each point ($\theta_0$; $\rho_0$) corresponds to a line $x \cos \theta_0 + y \sin \theta_0 = \rho_0$ in the source plane of interest. The intensity of the point is then proportional to the length of its corresponding line.

Another possible transform that can be applied to epipolar planes p, so as to represent the planes in a new space where line detection is easier, is the Hough Transform's algorithm which can be considered as a an algorithm to compute a discretized version of the Radon transform.

A possible algorithm to compute the Hough Transform of a two dimension matrix I representing an image could be the following:

```
1:  Discretize the range of θ values in a vector Θ.
2:  Discretize the ρ parameter into n_ρ distinct values.
3:  Construct the Length(Θ) x n_ρ output matrix H.
4:  Set all elements of H initially to 0.
5:  for each feature point (x; V_x) in I do
6:      for each θ ∈ Θ do
7:          ρ = x cos θ + y sin θ
8:          H(θ;ρ) = H(θ;ρ) + 1
9:      end for
10: end for
11: return the output image H
```

The reason that the Hough Transform uses polar coordinates (i.e $\theta$-$\rho$ parametrization) rather than the familiar slope-intercept form is that both slope and intercept are unbounded even for a finite x-y plane (i.e. a digital image). In the traditional model y=mx+h, the slope m is not bounded whereas $\theta$ in the Hough model is bounded to the interval $-\Pi/2; \Pi/2$.

The duality between the original $x$-$V_x$ space and the transformed $\theta$-$\rho$ space is such that each point in the $x$-$V_x$ epipolar plane is mapped to a harmonic curve in the transformed $\theta$-$\rho$ plane. Moreover, each point in the $\theta$-$\rho$ space corresponds to a unique line in the $x$-$V_x$ epipolar plane.

A set of collinear points $P_1$, $P_2$, $P_i$. in the epipolar plane p corresponds to intersection of their corresponding curves in the $\theta$-$\rho$ curve which means more intensity in the points of intersection. Therefore, prospective lines l in the epipolar plane p correspond to $\theta$-$\rho$ points with highest intensity (i.e. peaks). The identification of epipolar lines in the transformed $\theta$-$\rho$ plane thus can be performed by selecting points with intensity higher than a threshold $\tau_1$.

One key property of the Radon and Hough Transform is that rotation (i.e. change of $\theta$) in the image plane is converted to a simple translation in the $\theta$-$\rho$ plane. It is especially useful if we want to derive a rotation-invariant representation from the $\theta$-$\rho$ image. This can be done by setting the minimum $\theta$ value to 0. This cancels the effect of any uniform change of $\theta$.

However, what happens in the epipolar planes during scaling is a constant change of the slope m, but not a constant change of $\theta$. It would be desirable to cancel the effect of adding a constant $\Delta$ to all $m_i$ slopes of epipolar lines. This is not easy to do with the Hough's $\theta$-$\rho$ formulation since $\theta = -\text{arccot}(m)$ and the relation between arccot (m) and $\text{arccot}(m+\Delta)$ is not algebraically well-defined.

Therefore, another transform would be desirable for the representation of lines that, as well as having bounded parameter set, gives us the possibility to isolate uniform changes of slope.

The following exponential Radon Transform is a transform which uses an $\lambda$-$\mu$ parametrization and has all the desired properties we are seeking:

$$\lambda y + \lambda \ln \lambda x = \mu$$

In this relation, $\lambda$ is the compressed slope and is calculated from the slope as $\lambda = e^{-m}$. Therefore, for all positive slope values, $\lambda$ is unique and bounded between 0 and 1. Moreover, $\mu$ is also bounded for a bounded range of x and y values. Therefore, both parameters belong to the same range. This significantly simplifies and justifies further discrimination steps.

A possible algorithm to compute the Exponential-Radon Transform E of a two dimension matrix I representing an epipolar plane $\lambda$-$\mu$ could be the following:

```
1:  Discretize the range of λ values in a vector Λ.
2:  Discretize the μ parameter into n_μ distinct values.
3:  Construct the Length(Λ) x n_μ output matrix H.
4:  Set all elements of H initially to 0.
5:  for each feature point (x; y) in I do
6:      for each λ ∈ Λ do
7:          μ = λy + λlnλx
8:          H(λ,μ) = H(λ,μ) + 1
9:      end for
10: end for
11: return the output image H
```

The Exponential Radon Transform is not as general as the Hough Transform. First, it can transform only lines with positive slope. Moreover, it is unable to detect fully vertical lines. However, these drawbacks are not important since these situations will not happen in an epipolar plane. The slopes of all lines in an epipolar plane are either positive or negative. Moreover, a vertical line corresponds to a point in infinity which is physically impossible. Therefore, the Exponential Radon Transform is sufficient to represent all lines present in an epipolar plane.

One property of the Exponential Radon Transform that makes it useful and beneficial for local feature identification is that it can isolate and cancel the effect of uniform changes of slope. Suppose $\lambda_m$ is the $\lambda$ parameter corresponding to a line with slope m. We observe that $$\lambda_{m+\Delta} = \lambda_m e^{-\Delta}$$

Therefore, the effect of adding a constant $\Delta$ to all $m_i$ values could be cancelled out by dividing all their corresponding $\lambda_i$ by the largest one. Therefore, scaling of the original plenoptic image results in a change of slope of the lines in the epipolar planes that could be cancelled out in the Exponential Radon Transform of this plane by a simple division.

Alternatively, the effect of scaling can be modelled by transforming the $\lambda$-$\mu$ image as $(\lambda,\mu) \rightarrow (\sigma\lambda,\mu)$. One computationally efficient way to achieve a scale-invariant representation is by integrating over $\lambda$ since only this parameter changes while scaling. We define g as:

$$g(\mu) = \int_0^1 E(\lambda,\mu) d\lambda'$$

The use of such method can be justified intuitively. Scaling the scene, only changes the slopes of epipolar lines which in turn cause change only in $\lambda$. Therefore, by integrating over $\lambda$, we sum over all possible shearings (slope changes). In discrete cases, we discrete $g(\mu)$ by considering it as a vector.

The integration approach has the significant benefit that it relaxes the need to explicitly extract line information from the radon plane. This task requires thresholding the transform images which adds many parameters to the problem.

Other transforms, such as the Mellin transform, may also be used to cancel the effect of scaling from the Exponential Radon representation. The Mellin transform is an integral transform similar in some sense to the Fourier transform. The beneficial property that the magnitude of the Mellin transform of a function f is invariant to scaling, makes it a candidate approach for scale-invariant lightfield representation. We may also consider using cascading methods such to first transform R such that scalings become translations, and then applying a translation invariant transform such as the scattering transform.

To improve accuracy, we note that each epipolar line l (i.e. a feature path) corresponds to a single unique feature. Preferably all points $P_i$ along an epipolar line l should ideally have equal intensity or color. Therefore a post-processing step 106' could be applied after the Hough or Exponential Radon transform 106 in order to ignore lines for which variance of intensity or color along the points is above some threshold. Other postprocessing steps may similarly apply to reduce the number of feature points to consider.

After applying a transform, such as the Hough or Exponential Radon Transform to at least some of the epipolar planes, and the steps of identifying epipolar lines from the transformed space, we obtain after step 107 epipolar line segments which are paths traversed by image features. Now we can use these epipolar lines, or some of those lines, as local features points fp.

After selecting peaks from the transformed $\theta$-$\rho$ or $\lambda$-$\mu$ plane, lines are formed in the epipolar plane p by determining their two endpoints, or two other relevant points. In this step we can prune the set of detected lines and only retain the most stable ones. For example we can omit the lines shorter than a threshold $\tau 2$.

Each epipolar line segment corresponds to a single unique image features. So we can simply use at step 108 the starting point, or the end point, or any other defined point, of each line segment as a feature point fp. All points of a line segment represent the same feature. Therefore it does not actually matter which point along the line segment is selected as the feature points.

Considering the epipolar plane p at which the epipolar line l resides, the full three dimensional coordinates of the feature point (x; y; $V_x$) and the specific image ($V_x$ index) in which it lies is computed at step 108. These information can be used to describe the point as a feature vector.

Applying the same extraction to some or all epipolar planes $p_i$ and aggregating the results, a set S of feature points $fp_i$ describing the whole epipolar volume V can be retrieved.

The size of the feature set S is smaller than the set of features obtained with conventional feature extraction methods applied to all images of the volume and aggregate the results. This is because of the fact that many redundant features (points along the same epipolar line) are ignored. A second reason would be that many unstable features (those that appear only on a few images) are not selected using the new method of the invention since we omit lines shorter than a threshold. A feature should be present in (at least) more than one image to be selected by our approach.

A method for retrieving feature points from an epipolar volume V could be performed with the following steps:

```
1:  Set S = Ø.
2:  for each epipolar plane P in V corresponding to Y = y₀ do
3:      apply a low-pass filter to P (optional)
4:      apply edge detection to P and convert P to a binary image, for
example by applying edge detection (optional)
5:      Apply a Transform, such as the Hough Transform or the
Exponential Radon Transform to P, and extract all line segments.
6:      for each starting point (x_i; V_xi) of a line segment do
7:          Select (x_i; V_xi) as a feature points.
8:          Add point (x_i; y₀; V_xi) to the set of features S
9:      end for
10: end for
11: return the set of feature points S
```

Extracting feature points fp directly from the output of the Hough or Exponential Radon Transform has the benefit of utilizing the information of the epipolar planes. However, the set of selected points is dependent on the edge detection output (if applied) and also the traditional criteria for feature detection (corner, . . . ) are not explicitly addressed (although they are usually met).

Therefore, other possible ways for feature extraction in the plenoptic space could be used. For example, a sliding windows method could be considered. In this case, instead of using the starting point of each epipolar line as the feature point, an information about the local distribution of lines and their orientations in different parts of the epipolar planes is used to find more robust feature points. In one example, a window of fixed size w is built around each prospective feature point. All epipolar lines which fully or partially lie inside this window are then considered. The number of lines and the distribution of their orientations could be used as a measure of how significant a prospective feature point is. We call this measure the significance ratio. The significance ratio measures the number of epipolar lines passing through neighbourhood of a point. The more lines passing from neighbourhood of a point, the more significant the point is as a feature point. As well as the number of lines, we may also consider their orientations. The windows in which there are lines with many different orientations can be considered more significant than those with many equal-orientation lines in neighbourhood. Variance of orientations (or slopes) of lines could be considered a good measure of diversity. By considering line variances, we are implicitly assuming that feature points lie in area in which depth changes, which is usually true.

The significance ratio for some or all points in all epipolar planes may be computed; those points whose significance ratio exceeds a predefined threshold are selected as feature points.

In order to improve the running time of this sliding windows method, it may be possible to compute the significance ratio only for some of the prospective feature points, and to prune the set or possible feature point. One possible method for reducing the number of candidates is to use a conventional two-dimensional feature detection algorithm as a preprocessing step in order to obtain a reduced set of feature points.

Another possibility is to apply a conventional two-dimensional corner/feature detection method to all image planes, and to retrieve a relatively large set of prospective feature points. In a second step, performed in the epipolar plane space, only those lines formed by prospective points identified during the previous step are considered.

The identified feature points can be described using multi-dimensional feature vectors. This is done using a feature description method. There are various feature description algorithms, generating vectors of various dimensionality. An appropriate feature description should be as short as possible while retaining distinguishability between different features. To obtain a feature vector, the feature point itself as well as its neighbouring points are considered and based on intensity of these points, a feature vector is extracted. The extracted vector should be as much as possible invariant to affine transformations in the image.

Various feature descriptors applying to 2D images have been proposed in the literature so far. Among them, the SIFT method and BRIEF methods have shown good results. BRIEF is not as accurate as SIFT but its significance speed improvement makes it a choice for real-time applications.

For the proposed plenoptic feature extraction methods, one could consider a three-dimensional (x,y and Vx) neighbourhood of feature points and a three-dimensional feature descriptor. For example, SIFT or BRIEF can be extended to three dimensions. Another possibility is to use a traditional two dimensional descriptor by considering only the image plane in which the feature point falls. This is reasonable since feature paths all represent a single unique feature and therefore it may be redundant to consider multiple image planes to extract a feature descriptor. Using a two dimensional descriptor has the extra advantage that it makes it easier to perform matching between volumes of different thicknesses and even matching between a volume and a single image.

The feature identification and description based on epipolar volumes has the further advantage of being less dependent on rotation. The most straightforward case of rotation is when all objects in the scene are rotated by a constant angle θ. Since we know that the slope and intercept of epipolar lines correspond to Z and X coordinate of the corresponding scene point, rotating the scene of interest along the Y axis causes rotation in the X Z plane that is in turn the parameter space of the epipolar lines if we used the slope-intercept parametrization.

If we use instead the exponential Radon Transform, rotation of the X-Z plane can be converted to a one-dimensional translation if we transform the X-Z coordinates to polar coordinates. In the $\lambda$-$\mu$ plane, we can modify polar coordinates and move to the following r'-φ' space $$r' = e^{-\left(\sqrt{\ln^2\lambda + \frac{\mu^2}{\lambda^2}}\right)}$$

$$\phi' = \mathrm{atan}^2\left(-\ln(\lambda), \frac{\mu}{\lambda}\right).$$

In the r'-φ' space, rotations only change φ' therefore we can integrate over φ' in order to cancel the effect of rotation this case.

If we rotate a moving camera, or perform any equivalent rotation, (so that it is not orthogonal to the scene normal anymore and then capture the plenoptic image by moving it along the X-axis, what happens is equivalent to keeping the camera aligned (orthogonal to the scene) but moving it in a diagonal path, not a horizontal one. This causes change of the Z value during the camera movement and therefore feature paths will no longer be lines (as in the case of epipolar lines). In fact, points will be transformed in the epipolar volume into epipolar hyperbolas with two degrees of freedom which are equivalent to the slope and intercept of epipolar lines. Detection of the hyperbolas' parameters and the angle of rations can be done using an algorithm similar to the Radon or the Hough transform in order to extract features.

The same could apply to the rotation of a camera array in which all cameras are mounted on a single long bar and in which the bar is rotated along its center. This is equivalent to a rotation of the scene and we could use the same technique to obtain a rotation-invariant representation of the scene.

Rotating the scene of interest along the Z axis is equivalent to rotating the image slices or so-called in-plane rotation. In the present invention it is desirable to cascade a series of transformation-invariant transforms. Therefore, the result of applying in-plane rotation invariance preferably should preserve other types of transformations and not cause loss of information. Because of the cascaded system, what we seek for in-plane rotation invariance is not a rotation-invariant representation such as a feature vector, but an approach to cancel the effect of in-plane rotation and align every input image to a reference orientation.

To deal with the problem of orientation alignment, we detect the dominant or principal orientation in the images (i.e x-y slices). The dominant or principal orientation of an image is formally, a direction which is as much as possible orthogonal to the direction of all gradients (derivative with respect to x and y) in the image; informally, in a photos of a building for example, we expect that horizontal lines of the building to be horizontal in the photo too, the dominant orientation is the angle between such lines and the horizontal axis of the images. This problem is typically solved on the gradient vectors of two-dimensional signals. Two main approaches can be used for dominant orientation estimation. The first one is based on Singular Value Decomposition which is more accurate but computationally more expensive. This method is based on finding a direction (angle) that is orthogonal to all gradients of the image. Such definition leads to minimizing the sum of inner products (or maximizing sum of angles) between the reference direction and all the gradients in the image. This optimization problem is solved by computing the Singular Value Decomposition (SVD) of the structure tensor of the image. The direction corresponding to the smaller eigenvalue gives the dominant direction.

The second approach which can be used for dominant orientation estimation, is much less computationally expensive, relies on computing the average phase among all gradient vectors in the image, based on the fact that image gradients can be considered as complex vectors. Rotating the scene (or camera) along the Z direction leads to linear change in the dominant orientation angle (orientation). The deviation from the correct orientation is mostly due to the error in orientation estimation. For example, rotating the image by 15 degrees leads to a dominant orientation change of almost 15 degrees for the SVD based method. The amount of error is a bit more for the averaging method. However, since we are merely looking for a reference orientation and not visually aligning the images into a horizontal setting, it is tolerable.

After detecting the principal orientation in the image, we rotate the image (back or forward) with respect to the dominant orientation. Thus, we assure that all possibly captured images are aligned to a reference orientation and therefore the effect of in-plane rotation has been cancelled out.

Dealing with the problem of orientation alignment using the dominant orientation approach has the benefit that, in case of combined rotation along the different axes, the rotation along the two other axes is retained by in-plane rotation. Therefore, we can cascade the three rotation-invariant transforms such that in-plane invariance is executed first and assure that rotation in the other planes is also executed.

Rotating the scene of interest along the X axis is usually known as Tilting. Tilting operates in a single Y-Z slice and therefore can be isolated and analyzed more easily this way. In the three-dimensional light field capturing case where a linear camera array or camera movement along the X axis is employed to capture the sub-aperture images of the light field, tilting does not affect the direction in which the camera moves. Therefore, there is not much extra information in dealing with tilting in the plenoptic space than the regular color or intensity space.

In the image plane, tilting operates in one single column only. In other words, tilting a point in an image only affects its row and not its corresponding column. This helps is dealing with this transform.

If we denote the vertical position of a point in the image as r (Note that by the pinhole image formation formula y=f(Y/Z), wherein y is proportional to the ratio of Y and Z), then after tilting the camera to 0 degrees, the new vertical position of the point will be:

$$f(r) = \frac{r - \tan\theta}{r\tan\theta + 1}$$

Therefore we can simulate the effect of tilting by considering different positions of a point due to different reasonable amounts of tilts (e.g. $-\pi/4 \leq \theta \leq \pi/4$).

There are two main approaches to cancel the effect of tilting: normalization and simulation. In simulation, the tilting is applied to the image for a reasonable finite range of tilting angles. The SIFT feature descriptor (the SIFT feature descriptor is well known feature description algorithm which is used for color and grayscale 2d images) is an example of using simulation to achieve scale invariance. Here, we simulate the tilting factor corresponding to different amounts of camera rotation and concatenate the feature descriptors resulted from each one. Therefore, we have taken into account most probable tilts and therefore tiltings do not affect the results.

The second approach which is computationally less expensive is normalization. In this approach we tilt every image back to a reference camera orientation, without knowing possible tilting factors of prospective matching images. To do so, we notice that for small values of Θ, tilting can be approximated by a linear equation. Therefore, the tilting transform can be approximated by a scaling and a translation in one dimension. The Fourier and the Mellin transforms are possible tilting transform which can be used as these transforms are covariant to translation and scaling, respectively. If we apply either of these transforms and compute the magnitude of the resulting signal, we can achieve invariance for moderate amounts of tilting.

The order in which the invariance transforms (Rotation and Translation along the different axes) should be applied, may vary. However, preferably the transforms which normalize a specific parameter, such as in-plane rotation invariance, or illumination invariance preferably should be applied before any other transform such as scale invariance or Y-axis rotation. The transforms which apply a potentially irreversible description transform, such as scaling invariance, should preferably come as the next steps. Finally, the algorithms (i.e. invariance techniques) which are applied at the time of matching and distance computation e.g, Dynamic Time Warping for Translation Invariance, are preferably performed as the last step. Between these, depending on invariance and covariance properties of the modules (i.e. transformation-invariance algorithms), different parts (i.e. Invariance-Acquisition Transforms or Techniques) can be swapped to achieve optimum performance.

A possible example of cascading different invariance transform is as follows:

a. Rotation along the Z-Axis is normalized by finding the dominant orientation and rotating the image plane with respect to it.

b. Translation in the Y axis (and the X-axis rotation which we approximated as a Y-axis rotation) is cancelled out by first applying a translation invariant image transform (such as the Fourier or Scattering Transform), normalizing the variant part (e.g the phase in the Fourier space) to be constant, and inverse-transforming to be in the image plane again.

c. Converting each view of the light-field from the RGB space to the YCbCr (or HSV) space and normalizing the illumination channel Y (or V in HSV) to be consistent among all views.

d. Apply an Edge detection algorithm to each EPI plane, thereby removing the illumination effects.

e. Apply the STILT (or exponential Radon Transform) to each EPI plane in the light-field (or patch)

f. Compute Scale-Invariant (i.e. Z-Axis Translation Invariant) feature vector by integrating along the columns of the STILT space. Call this vector SIFV.

g. Transform the STILt space to the space defined in [0072].

h. Compute EPI Rotation-Invariant (i.e. Y-Axis Rotation Invariant) feature vector by integrating along the columns of the space generated in the previous step. Call this vector RIFV.

i. SIFV and RIFV are the main feature vectors extracted from the light-field or patch. Combined, they achieve invariance against Rotation (in all X,Y and Z axes) and Translation in the Y and Z axes.

j. By comparing SIFV of two vectors using Dynamic Time Warping (DTW) an X-Axis Invariance too is achieved.

k. We then combine the distance measure computed by DTW with the one computed by (probably) the Euclidean distance between the RIFV of two light fields to have a fully invariant matching process.

The present invention is also related to a method for image retrieval based on feature vectors identified and described with the above mentioned method. For example, a reference image that matches a given captured image could be retrieved from an image database in a server by comparing feature vectors retrieved with the above mentioned method.

The present invention also relates to a method of matching a single 2D or 3D image, or a 2D and half image (such as RGB-D or depth field images), on one side with a plenoptic image on the other side. This method thus comprises a match of features describing the 2D, 2D and half or 3D images with features extracted from data representing a lightfield using one of the above described methods.

The various operations of methods described above may be performed by any suitable means capable of performing the operations, such as various hardware and/or software component(s), circuits, and/or module(s). Generally, any operations described in the application may be performed by corresponding functional means capable of performing the operations. The various means, logical blocks, and modules may include various hardware and/or software component(s) and/or module(s), including, but not limited to a circuit, an application specific integrated circuit (ASIC), or a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein.

As used herein, the term "determining" encompasses a wide variety of actions. For example, "determining" may include calculating, computing, processing, deriving, investigating, looking up (e.g., looking up in a table, a database or another data structure), ascertaining, estimating and the like. Also, "determining" may include receiving (e.g., receiving information), accessing (e.g., accessing data in a memory) and the like. Also, "determining" may include resolving, selecting, choosing, establishing and the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A software module may consist of an executable program, a portion or routine or library used in a complete program, a plurality of interconnected programs, an "apps" executed by many smartphones, tablets or computers, a widget, a Flash application, a portion of HTML code, etc. A storage medium may be coupled to a processor such that the processor can read information from, and write information to, the storage medium. In the alternative, the storage medium may be integral to the processor. A database may be implemented as any structured collection of data, including a SQL database, a set of XML documents, a semantical database, or set of information available over an IP network, or any other suitable structure.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of local feature identification and description, comprising the steps of:
retrieving data representing a lightfield, wherein the lightfield is represented by a plenoptic function which comprises at least three dimensions;
forming an epipolar volume (V) from the retrieved data;
applying a transform to epipolar planes retrieved from said epipolar volume, so as to represent said epipolar planes in a new space in which detection of epipolar lines is easier;
identifying a plurality of epipolar lines in the new space;
identifying local features (fp) by selecting a point along at least some of said epipolar lines.

2. The method of claim 1, wherein said transform is a Radon transform.

3. The method of claim 1, wherein said transform is a Hough transform.

4. The method of claim 1, wherein said transform is based on the relation $$\lambda y + \lambda \ln \lambda x = \mu$$

wherein x and y are coordinates in the epipolar plane, $\lambda$ is the compressed slope and $\mu$ is the outcome of the transform.

5. The method of claim 4, comprising a step of identifying a line and dividing all the corresponding $\lambda i$ by the largest one, $\lambda i$ is the compressed slope of epipolar line i.

6. The method of claim 4, further comprising a step of computing a scale-invariant value (g(s)) as an integral over $\lambda$ wherein $\lambda$ is the compressed slope of an epipolar line.

7. The method of claim 1, wherein said transform is a Mellin transform.

8. The method of claim 1, comprising a step of applying a low-pass filter to data representing said epipolar plane.

9. The method of claim 1, comprising a step of applying an edge detection algorithm to data representing said epipolar plane.

10. The method of claim 1, comprising a step of identifying prospective feature points with a corner/feature method applied to an initial image corresponding to said lightfield, and only considering said lines in said new space that correspond to said prospective feature points as possible feature points.

11. The method of claim 1, comprising a step of determining from said new space lines (l) in said epipolar plane.

12. The method of claim 11, comprising selecting points in said new space with an intensity higher than a predefined threshold, and determining lines in said epipolar plane that correspond to said selected point.

13. The method of claim 11, comprising a step of pruning the set of detected lines and only retaining the most stable ones, for example the lines longer than a threshold $\tau 2$.

14. The method of claim 1, comprising a post-processing step applied after said transform step in order to ignore lines for which variance of intensity or color along the points is above some threshold, wherein the post-processing step comprises, comparing the variance of intensity or color along said points with a threshold, identify points which have variance of intensity or color which is below the threshold; omitting those point which are identified.

15. The method of claim 1, comprising a step of retrieving one point along at least one selected epipolar line and this point to identify a local feature.

16. The method of claim 15, wherein said local feature is described with a feature vector (fp).

17. The method of claim 16, wherein said local feature is described with a three dimensional SIFT or BRIEF feature vector (fp).

18. The method of claim 15, wherein said local feature is described with a two dimensional feature vector (fp) by considering only the image plane in which the feature point falls.

19. The method of claim 1, further comprising computing a significance ratio for at least some prospective feature points, and omitting those feature points whose significance ration is lower than a threshold.

20. The method of claim 19, wherein the significance ratio for a prospective feature point depends on the number and/or orientation or epipolar lines passing through a neighborhood of said prospective feature point.

21. The method of claim 1, comprising a step of matching said local features (fp) with local features extracted from a 2D, 2D and half or 3D image.

22. The method of claim 1, further comprising a steps of, detecting the dominant orientation of an image which corresponds to said light field, and rotating each of a plurality of images, each of which corresponds to a light field, so that each of the plurality of image has its orientation aligned to a reference orientation computed based on the detected dominant orientation.

23. The method of claim 1, further comprising steps of, applying a tilting transform to an image which corresponds to said light field, wherein the step of applying a tilting transform to an image comprises scaling and translating the image in one dimension.

24. The method according to claim 23 wherein the tilting transform comprises a Fourier and/or a Mellin transforms.

25. A method according to claim 9 further comprising the step of applying a STILT transform to the data representing said epipolar plane after the edge detection algorithm has been applied.

26. An apparatus for identifying local features in lightfield representing data, comprising a lightfield data retrieving device for retrieving data representing a lightfield; and data processing means programmed for:
  forming an epipolar volume (V) from the retrieved data;
  applying a transform to epipolar planes retrieved from said epipolar volume, so as to represent said epipolar planes in a new space;
  identifying a plurality of epipolar lines;
  identifying local features (fp) based on at least some of said epipolar lines.

27. A non-transitory machine readable medium with program code being stored arranged for causing a processor to carry out a method of, local feature identification and description, when said processor executes said program code, said method of local feature identification and description, comprising the steps of:
  retrieving data representing a lightfield;
  forming an epipolar volume (V) from the retrieved data;
  applying a transform to epipolar planes retrieved from said epipolar volume, so as to represent said epipolar planes in a new space;
  identifying a plurality of epipolar lines;
  identifying local features (fp) based on at least some of said epipolar lines.

28. A method of local feature identification and description, comprising the steps of:
  retrieving data representing a lightfield, wherein the light field is represented by a plenoptic function which comprises at least three dimensions;
  forming an epipolar volume (V) from the retrieved data;
  applying a transform to epipolar planes retrieved from said epipolar volume, so as to represent said epipolar planes in a new space in which detection of epipolar lines is easier;
  identifying a plurality of epipolar lines in the new space;
  identifying local features (fp) by selecting a point along at least some of said epipolar tines,
  wherein said transform comprises the relation $$\lambda y + \lambda \ln \lambda x = \mu$$

wherein one side of the epipolar plane lies on a first axis and a second side of the epipolar plane lies on a second axis, and wherein x and y are coordinates in the first and second axes respectively and thus are coordinates in the epipolar plane, and wherein $\lambda$ is the compressed slope and $\mu$ is the outcome of the transform; and wherein the method further comprises the step of,
  compensating for scaling of the plenoptic images in red data, by carrying out a mathematical operation on the transform of epipolar plane.

29. A method according to claim 1 further comprising the steps of, comparing the length of the epipolar lines which are identified with a predefined threshold length, and omitting epipolar lines which have a length less than a predefined threshold length to ensure that only stable epipolar lines remain.

30. A method according to claim 1 further comprising the steps of, determining coordinates having at least three dimensions for the identified local feature (fp), wherein said three dimensions include at least x and y coordinates for the selected point in the epipolar plane.

* * * * *